No. 751,105. PATENTED FEB. 2, 1904.
E. PIGGOTT.
COMBINED WHEEL AND HAND HOE.
APPLICATION FILED OCT. 13, 1902.
NO MODEL.
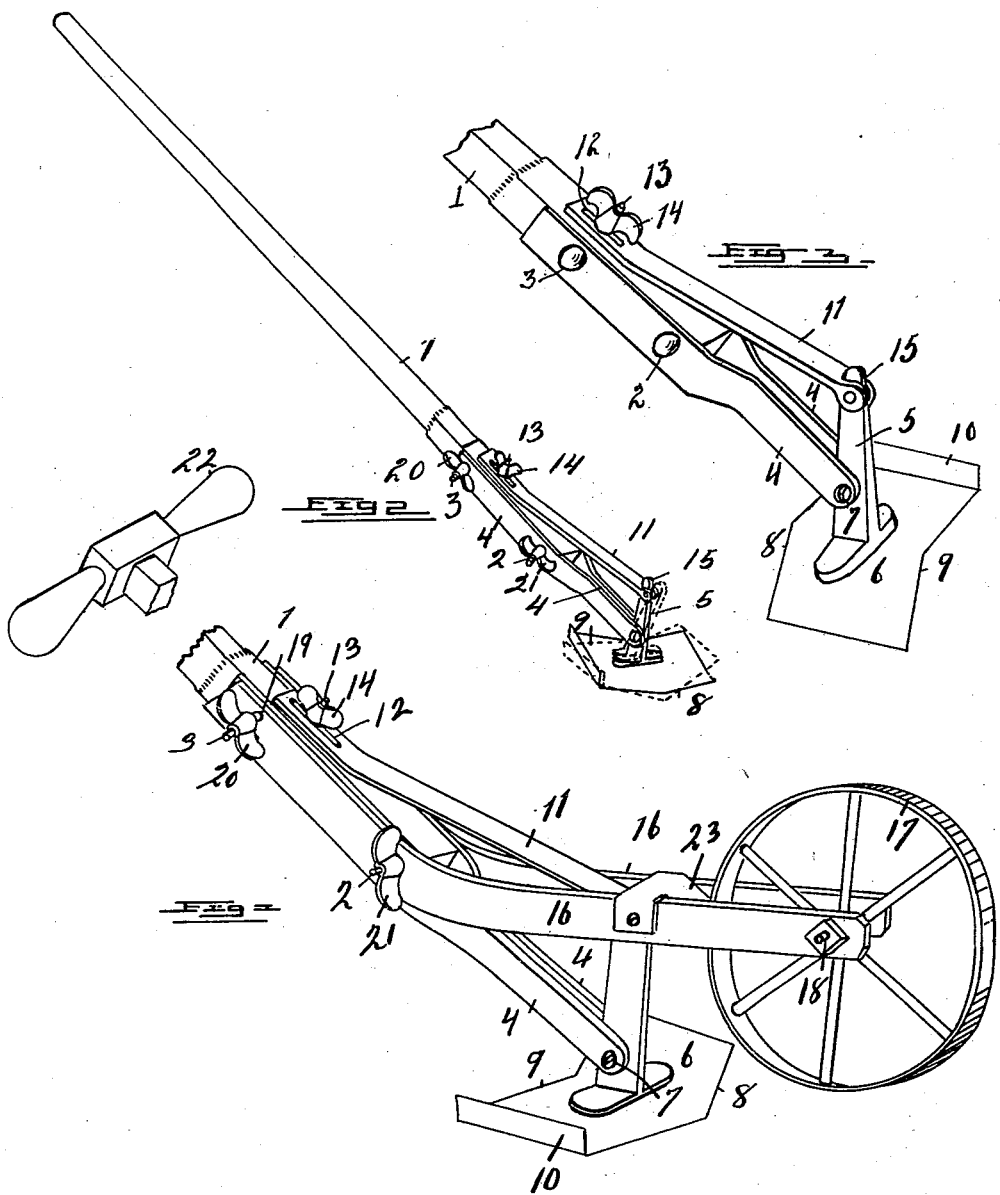

No. 751,105. Patented February 2, 1904.

UNITED STATES PATENT OFFICE.

EDMUND PIGGOTT, OF DETROIT, MICHIGAN, ASSIGNOR TO PIGGOTT MANUFACTURING COMPANY, LTD., OF DETROIT, MICHIGAN, A PARTNERSHIP.

COMBINED WHEEL AND HAND HOE.

SPECIFICATION forming part of Letters Patent No. 751,105, dated February 2, 1904.

Application filed October 13, 1902. Serial No. 127,005. (No model.)

*To all whom it may concern:*

Be it known that I, EDMUND PIGGOTT, a citizen of the United States, residing at Detroit, in the county of Wayne, State of Michigan, have invented certain new and useful Improvements in a Combined Wheel and Hand Hoe; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a combined wheel and hand hoe; and it consists in the construction and arrangement of parts hereinafter fully set forth, and pointed out particularly in the claims.

The objects of the invention are to provide a hoe of the character described comprising a reversible blade adapted to be used in connection with a transporting-wheel or independently thereof having means for adjusting the blade to any desired pitch and for raising and lowering the handle to suit the height of the operator.

The above objects are attained by the construction illustrated in the accompanying drawings, in which—

Figure 1 is a perspective view of my improved hoe, showing the transporting-wheel attached thereto, a portion of the handle being broken away. Fig. 2 is a perspective view of the hoe, showing the transporting-wheel removed and the hoe adapted for use as an ordinary hand-hoe. Fig. 3 is a similar view showing the blade of the hoe reversed to present its concave edge forward and the brace which supports the standard of the hoe secured to the opposite sides of the handle from that shown in Fig. 2 and the confining-bolt and thumb-nut also reversed.

Referring to the characters of reference, 1 designates a handle of any suitable construction, to the lower end of which are attached by the transverse bolts 2 and 3 the parallel bars 4, whose lower ends converge and receive between them the stem 5 of the hoe-blade 6, said stem being pivoted between said bars upon the pivot-bolt 7. The forward edge 8 of the hoe-blade is substantially convex, while the rear edge 9 thereof is concave. At one end of the blade is an upwardly-turned lip 10, adapted to cut through the surface of the ground to prevent loosening the earth around the roots of the plants and indicate to the operator the position of the blade in the ground, thereby avoiding an accidental cutting of the plants. To the upper end of the standard 5 of the hoe is pivoted a brace-rod 11, which extends upwardly onto the handle and is pivoted in its upper end with a slot 12, through which passes a bolt 13, carrying a thumb-nut 14. By loosening said nut the rod may be moved longitudinally to swing the blade, as shown by dotted lines in Fig. 2, and adjust the angle thereof as desired. After adjustment the blade is secured in place by tightening the nut 14.

The hoe is ordinarily used with the convex edge forward; but should it be desired to reverse the blade, so as to present the concave edge forward, the bolt 15, which connects the standard of the blade to the rod 11, is withdrawn, thereby permitting the standard to swing between the sides of the bars 4, when by turning the handle over and reattaching the rod 11 to the handle and to the standard the blade may be used with the concave edge forward, as shown in Fig. 3. In this operation it will be understood that it is necessary to change the brace-rod 11 from one side of the handle to the other.

To employ the hoe as a wheel-hoe, the curved side bars 16 are used, which receive the bolts 2 and 3, which pass through the handle, whereby said bars are retained in place. The wheel 17 is secured between the outer ends of said bars upon an axle-bolt 18 and is so positioned as to bear upon the ground in advance of the blade. To provide for raising and lowering the handle when the wheel is employed, the bars 16 at their upper ends are provided with transverse slots 19, through which the bolt 3 passes, whereby by loosening the nut 20 the handle may be raised or lowered, as required, said handle in this movement swinging upon the bolt 2 between the bars 16. After adjustment by tightening the nuts 20 and 21 the bars 16 may be securely locked in place.

Where the wheel is employed, a handle-bar 22, similar to that shown in Fig. 1, is preferably employed to enable the implement to be guided in its operation.

To prevent an accumulation of dirt upon the wheel, a scraper 23 is employed, which is mounted upon the bars 16.

It will be observed that when desiring to employ this hoe as a hand-hoe the wheel may be readily removed by withdrawing the bolts 2 and 3 and detaching from the handle the side bars 16.

Having thus fully set forth my invention, what I claim as new, and desire to secure by Letters Patent, is—

1. In a hoe, the combination of a handle, a blade having a vertical standard, said standard being pivotally attached to the handle, a brace-rod pivotally attached at its lower to the upper end of the standard of the blade, the upper end of said brace-rod extending onto the handle, and being movably attached thereto.

2. In a hoe, the combination with the handle, parallel bars attached thereto and extending from the end thereof, a blade having a vertical standard, said standard of the blade being pivoted between said bars so as to swing therebetween to allow a reversal of said blade, a brace-rod pivoted to the upper end of said standard and connected to the handle so as to adjust thereon.

3. In a hoe, the combination of a handle, parallel bars attached thereto, and projecting from the end thereof, a blade having a vertical standard, the standard of the blade pivoted between the projecting ends of said bars, a brace-rod pivoted to the upper end of said standard, the upper end of said rod lying upon the handle, and having a longitudinal slot therein, and a bolt passing through the handle and through said slot.

4. In a hoe, the combination with the handle, a blade pivoted thereto, means for adjusting said blade, side bars mounted upon the handle, a wheel journaled between the forward ends of said bars, and means for allowing a vertical movement of the handle between said bars at their upper ends.

5. In a hoe, the combination of the handle, a blade pivoted thereto, means for adjusting said blade, side bars mounted upon the handle and extending forward of the blade, a wheel journaled between the forward ends of said bars, a pivot-bolt passing through the bars near the lower end of the handle, transverse slots in said bars near their upper ends, and a bolt passing through the handle and through said slots.

In testimony whereof I sign this specification in the presence of two witnesses.

EDMUND PIGGOTT.

Witnesses:
  E. S. WHEELER,
  M. C. POOLE.